United States Patent
Harris et al.

(10) Patent No.: US 9,021,114 B2
(45) Date of Patent: Apr. 28, 2015

(54) AUTOMATIC CONNECTION OF COMPUTING DEVICES

(75) Inventors: Mike Harris, Santa Rosa, CA (US); Charles C. Scheinost, Forest Knolls, CA (US); Amit Kishnani, Foster City, CA (US); Bruce Bowman, San Jose, CA (US); Matthew Hamlin, San Francisco, CA (US); Matthew Johnson, Delano, MN (US); Tom Juhasz, Bainbridge Island, WA (US)

(73) Assignee: Adobe Systems Incorporated, San Jose, CA (US)

( * ) Notice: Subject to any disclaimer, the term of this patent is extended or adjusted under 35 U.S.C. 154(b) by 151 days.

(21) Appl. No.: 13/351,603

(22) Filed: Jan. 17, 2012

(65) Prior Publication Data
US 2014/0040490 A1    Feb. 6, 2014

(51) Int. Cl.
*G06F 15/16*     (2006.01)
*H04W 76/00*     (2009.01)

(52) U.S. Cl.
CPC ................................. *H04W 76/00* (2013.01)

(58) Field of Classification Search
CPC .... H04W 76/00; G06F 9/4443; G06F 9/4445; H04L 41/08; H04L 41/12; H04L 41/0654; H04L 67/16
USPC .......................................... 709/203, 225, 229
See application file for complete search history.

(56) References Cited

U.S. PATENT DOCUMENTS

| | | | |
|---|---|---|---|
| 6,944,662 B2 * | 9/2005 | Devine et al. | 709/225 |
| 7,155,681 B2 * | 12/2006 | Mansour et al. | 715/762 |
| 2002/0095399 A1 * | 7/2002 | Devine et al. | 707/1 |
| 2002/0129096 A1 * | 9/2002 | Mansour et al. | 709/203 |
| 2003/0028817 A1 * | 2/2003 | Suzuyama et al. | 714/4 |
| 2008/0082603 A1 * | 4/2008 | Mansour et al. | 709/203 |
| 2012/0163571 A1 * | 6/2012 | Brunson et al. | 379/93.02 |
| 2014/0040490 A1 * | 2/2014 | Harris et al. | 709/229 |

* cited by examiner

*Primary Examiner* — Thu Ha Nguyen
(74) *Attorney, Agent, or Firm* — Shook, Hardy & Bacon L.L.P.

(57) ABSTRACT

In one embodiment, a method of connecting to a client computing device is provided. The method is performed at a computing device, and in this method a connection is made to the client computing device. An inventory of the client computing device is then accessed. This inventory is stored in a storage device accessible by way of a computer network. Here, the storage device is separate from the client computing device and the computing device. A connection failure between the computing device and the client computing device is detected and thereafter, the inventory from the storage device is retrieved by way of the computer network. A reconnection to the client computing device can then be made based on the retrieved inventory.

19 Claims, 8 Drawing Sheets

AUTOMATIC CONNECTION OF COMPUTING DEVICES

FIELD

The present disclosure relates generally to device communications. In one example embodiment, the disclosure relates to automatic connection of computing devices.

BACKGROUND

Currently, many different steps need to be taken to connect two or more computing devices. For example, to connect a smart phone to a desktop computer by way of a computer network, a user has to look up a network address and other parameters of the desktop computer. The user then needs to unlock the smart phone and initiate a network connectivity application on the smart phone to input the network address and other parameters such that the two devices can locate and communicate with each other.

Developers often set up connections between devices in the development of software applications. It should be appreciated that every type of client computing device has its own set of software and hardware, which can render the same content differently. Accordingly, in one example, a Web developer typically needs to connect his desktop computer, which is used to design Web pages, to multiple client devices to see how the same Web pages are rendered on the different client devices. In a typical development workflow, the developer designs a Web page on the desktop computer, loads the Web page on each client device, and inspects the appearance of the Web page on the different types of client devices. If any incremental change is made to the Web page, the modified Web page needs to be loaded again on each client device.

However, the process of establishing a connection with each client device can be time consuming and labor intensive, meaning that for every client device, a developer has to configure each client device manually such that it can connect to the desktop computer. The process can be even more manually intensive when one or more client devices are disconnected from the desktop computer, thereby necessitating the developer to identify which of the devices has been disconnected and then manually repeating all the steps described above to connect to the desktop computer.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Figure 1:
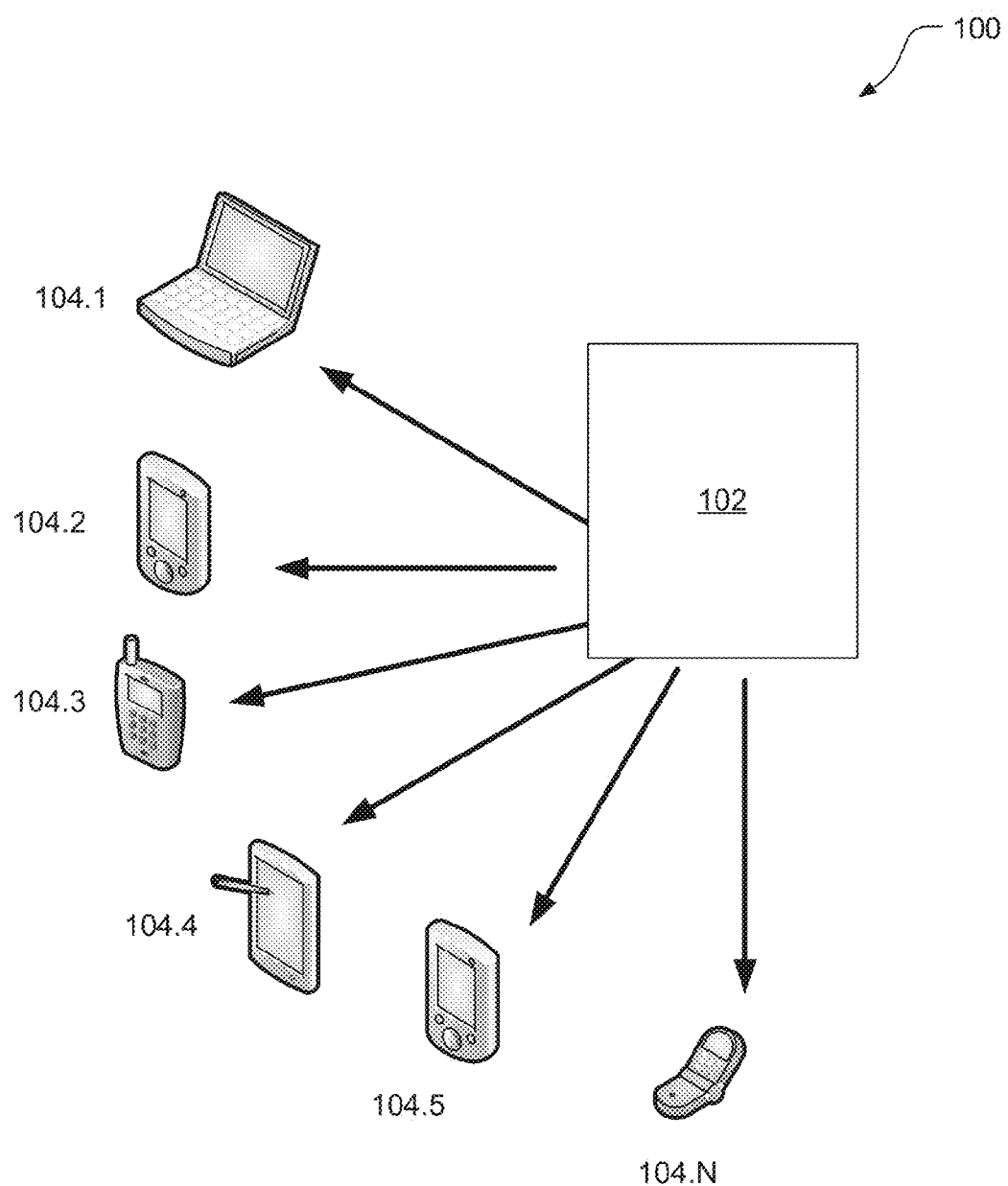
FIG. 1 is a diagram depicting a system for automatic connection of computing devices, in accordance with an example embodiment.

FIG. 1 is a diagram depicting a system for automatic network connection of computing devices, in accordance with an example embodiment. As depicted, the system 100 includes a computing device 102 that is in communication with multiple client computing devices 104.1, 104.2, . . . 104.N. As used herein, a "client computing device" refers to a computing device on a computer network that gains access to data files, programs, and other devices through another computing device, such as a server. Examples of client computing devices 104.N include desktop computers, mobile phones, laptops, tablet computers, personal digital assistants, and Set-top boxes (STB). In system 100, the computing device 102 functions as a server that provides instructions and data to the client computing devices 104. Example embodiments of the present invention provide various mechanisms for the client computing devices 104.N to connect to the computing device 102 and to automatically reestablish one or more network connections (or "connections") in the event that such connections have failed.

As an illustrative example, a Web developer who is designing Web pages typically needs to interface with many different client computing devices 104.N because each type of client computing device 104.N can render the Web pages differently. Instead of manually connecting to each client computing device 104, the Web developer using the computing device 102 to develop the Web pages can use the mechanisms described herein to automatically connect to multiple client computing devices 104.N. Once connected, the computing device 102 can transfer the Web pages or instructions to locate the Web pages (e.g., Uniform Resource Locator (URL)) to all the client computing devices 104.N almost simultaneously. Furthermore, as explained in more detail below, embodiments of the present invention also support automatic reconnection between client computing devices 104 and the computing device 102 should connections to one or more of the client computing devices 104.N fail.

Figure 2:
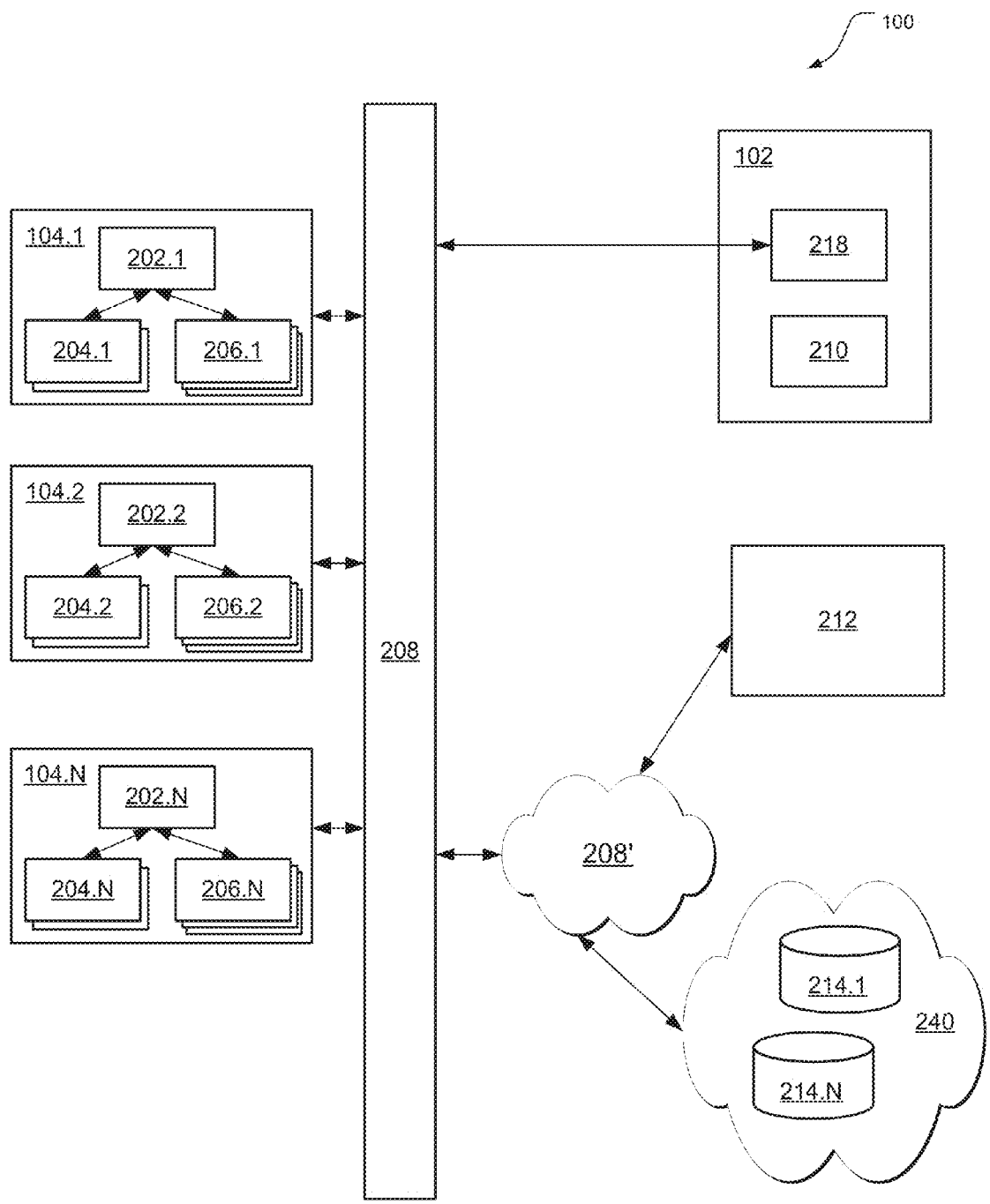
FIG. 2 is a block diagram depicting more details of the system depicted in FIG. 1 for automatic connection of computing devices, in accordance with an example embodiment.

FIG. 2 is a block diagram depicting more details of the system 100 depicted in FIG. 1 for automatic connection of computing devices, in accordance with an example embodiment. As depicted in FIG. 2, the system 100 includes client computing devices 104.1, 104.2, . . . 104.N, a computing device 102, a content server 212, and external storage devices 214.1 . . . 214.N. All the various components of the system 100 are in communication by way of one or more computer networks, such as wireless computer network 208 and Internet 208', which is a global system of interconnected computer networks. In this example, the client computing devices 104.N are in communication with the computing device 102 by way of a wireless computer network 208, but it should be appreciated that communication can also be by way of a wired computer network. In turn, the client computing devices 104.N and computing device 102 are in communication with content server 212 and external storage devices 214.N by way of the Internet 208'.

The content server 212 is a stand-alone device in which electronic documents with any content can be stored. A Web server is an example of a content server 212. Each client computing device 104.N includes an autoconnect client module 202.1, 202.2, . . . 202.N, one or more Web browsers 204.1, 204.2, . . . 204.N, and other content viewers 206.1, 206.2, . . . 206.N that display or render content provided by either the computing device 102 or the content server 212. As explained in detail below, each autoconnect client module 202.N provides various functionalities to a client computing device 104.N to connect to different computing devices.

In system 100, the computing device 102 includes an autoconnect server module 218 and, in this example, additionally includes a content creation tool 210, such as a Web design software. A user can use the content creation tool 210 to design various content, such as Web pages. The autoconnect server module 218 is configured to connect the computing device 102 to one or more client computing devices 104.N. After the connections have been established, the computing device 102 can then push content to each client computing device 104.N for display on its browser 204.N or content viewer 206.N. Examples of content that may be communicated to the client computing devices 104.N includes Web pages, document files, image files, asset files created by graphics editing programs for previewing, video files, and other files and data. Additionally, the content server 212 can also provide content to the client computing devices 104.N.

Each external storage device 214.N is separate from the computing devices 102 and 104.N. The external storage device 214.N provides addressable data storage for the computing devices 102 and 104.N, the data storage of which is not currently in the computing devices' 102 and 104.N main storage or memory. Examples of external storage devices 214.N include hard drives, flash memories, solid-state drives (SSDs), and tape storage. In one embodiment, the storage devices 214.N can be located in a cloud computing environment 240. Generally, cloud computing is a model for enabling on-demand network access to a shared pool of configurable computing resources (e.g., networks, servers, storage, applications, and services) that can be provisioned and released with minimal management effort or service provider interaction. The cloud computing environment 240 can include applications and enterprise services. The applications running on the cloud infrastructure are accessible from various client platforms (e.g., client computing devices 104.N) through thin client interfaces, such as Web browsers 204. In the cloud computing environment 240, each application relies on one or more enterprise services, which refer to the underlying structure supporting communications among units of work (also referred to as services) executed on behalf of the applications. The services provided by the enterprise applications are pooled to serve multiple applications and client platforms with different physical and virtual resources dynamically assigned and reassigned according to user demand.

Still referring to FIG. 2, as explained in more detail below, the computing devices 102 and 104.N can store inventories of the computing devices 102 and 104.N on one or more external storage devices 214.N. As also explained in detail below, such an inventory can be used to reconnect the computing devices 102 and 104.N in the event of a connection failure.

Figure 3:
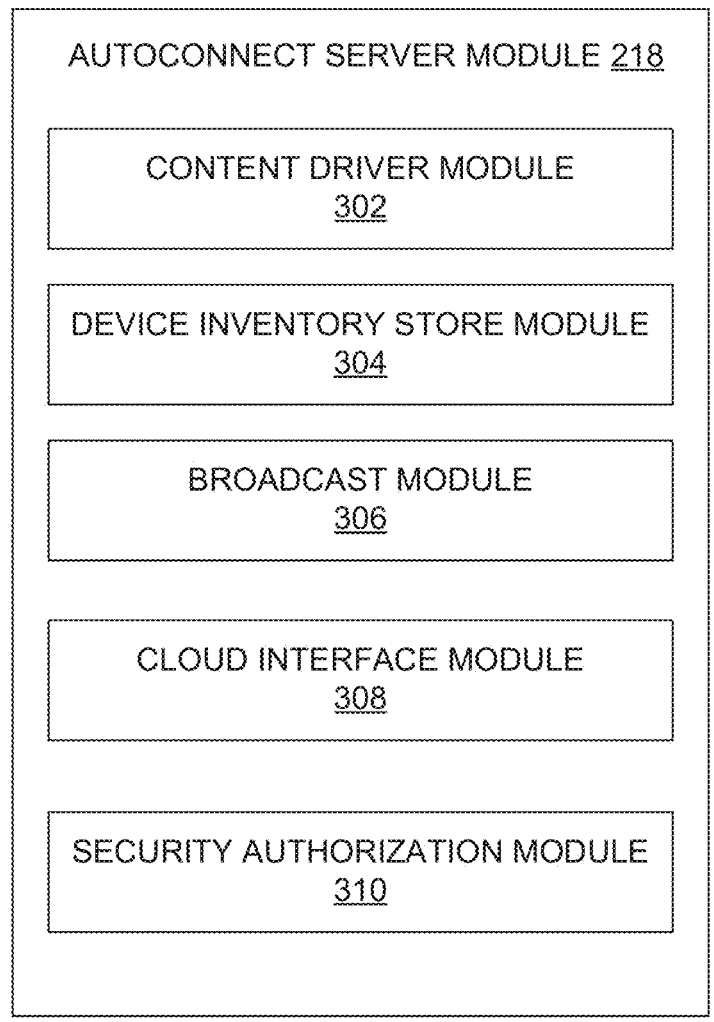
FIG. 3 is a block diagram of an autoconnect server module, in accordance with an example embodiment, included in the systems depicted in FIGS. 1 and 2.

FIG. 3 is a block diagram of an autoconnect server module 218, in accordance with an example embodiment, included in system 100 depicted in FIGS. 1 and 2, respectively. For example, the autoconnect server module 218 may form a part of or be executed on the computing device 102 depicted in FIGS. 1 and 2. In various embodiments, the autoconnect server module 218 may be used to implement computer programs, logic, applications, methods, processes, or software to connect to different client computing devices, as described in detail below.

In reference to FIG. 3, the autoconnect server module 218 includes a content driver module 302, a device inventory store module 304, a broadcast module 306, a cloud interface module 308, and a security authorization module 310. Generally, the content driver module 302 is configured to push content to one or more client computing devices. The device inventory store module 304 is configured to store an inventory of a computing device at a local storage device or an external storage device. An "inventory," as used herein, refers to a list of various attributes associated with a computing device. Examples of attributes include device name, model name, serial number, universally unique identifier (UUID), firmware version, connection history, network identifier, Internet Protocol (IP) address, desktop details, telephone number, carrier information, and other attributes. As explained in detail below, a computing device can use such inventory to reestablish a failed connection.

The broadcast module 306 is configured to broadcast connectivity information to one or more client computing devices. Additionally, the broadcast module 306 is configured to establish and maintain connections to the client computing devices.

The cloud interface module 308 is configured to interface with a cloud computing environment. As explained in more detail below, the autoconnect server module 218 can interface with the cloud computing environment by way of the cloud interface module 308 to store inventories on or retrieve inventories from external storage devices.

The security authorization module 310 is configured to establish a secured, trusted connection between the autoconnect server module 218 and one or more client computing devices. The security authorization module 310 provides security over one or more connections made in a computer network. For example, the security authorization module 310 can utilize a Secure Sockets Layer (SSL) protocol for managing the security of message transmissions. In another example, as explained in detail below, the security authorization module 310 can utilize authorization codes to secure connections.

Figure 4:
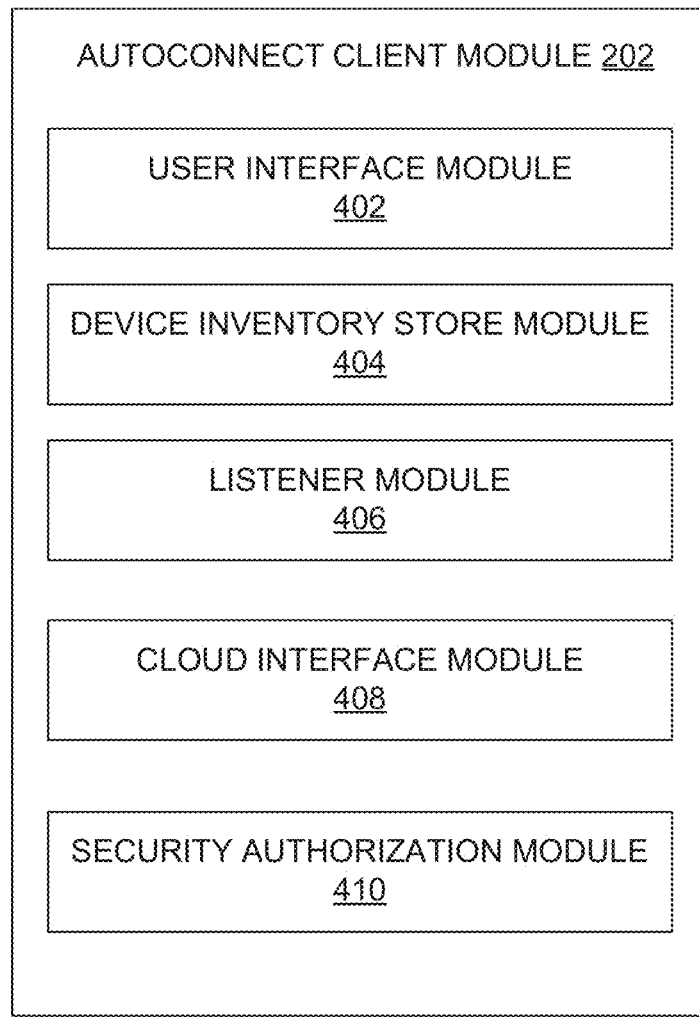
FIG. 4 is a block diagram of an autoconnect client module, in accordance with an example embodiment, that may be included in the systems depicted in FIGS. 1 and 2, respectively.

FIG. 4 is a block diagram of an autoconnect client module 202, in accordance with an example embodiment, that may be included in system 100 depicted in FIGS. 1 and 2. For example, the autoconnect client module 202 may form a part of or be executed on each of the client computing devices 104.N depicted in FIGS. 1 and 2. In various embodiments, the autoconnect client module 202 may be used to implement computer programs, logic, applications, methods, processes, or software to connect to different computing devices, as described in detail below.

In reference to FIG. 4, the autoconnect client module 202 can include a user interface module 402, a device inventory store module 404, a listener module 406, a cloud interface module 408, and a security authorization module 410. The user interface module 402 is configured to provide a user interface for display on a client computing device such that a user can use the user interface to provide commands to the autoconnect client module 202. For example, the user interface module 402 can display graphical user interfaces from which a user can input various authorization codes and select a particular computing device to connect from multiple computing devices.

The device inventory store module 404 is configured to store an inventory of a computing device at a local storage device or an external storage device. The listener module 406 is configured to establish and maintain a connection with a computing device. For example, the listener module 406 is configured to listen for broadcasts from the computing device, and respond accordingly in order to establish a connection to the computing device.

The cloud interface module 408 is configured to interface with a cloud computing environment. As explained in more detail below, the autoconnect client module 202 can interface with the cloud computing environment by way of the cloud interface module 408 to store inventories on or retrieve inventories from external storage devices.

The security authorization module 410 is configured to establish a secured, trusted connection between the autoconnect client module 202 and a computing device. The security authorization module 410 provides security over one or more connections made in a computer network. For example, the security authorization module 410 can utilize a Secure Sockets Layer (SSL) protocol for managing the security of message transmissions. In another example, as explained in detail below, the security authorization module 410 can utilize authorization codes to secure connections.

It should be appreciated that in other embodiments, the autoconnect server module 218 and the autoconnect client module 202 depicted in FIGS. 3 and 4, respectively, may include fewer or more modules apart from those shown in FIGS. 3 and 4. For example, in an alternate embodiment, the listener module 406 and the security authorization module 410 can be integrated into one module. The modules 302, 304, 306, 308, 310, 402, 404, 406, 408, and 410 may be in the form of software that is processed by a processor. In another example, as explained in more detail below, the modules may be in a form of firmware that is processed by application specific integrated circuits (ASIC), which may be integrated into a circuit board. Alternatively, the modules may be in the form of one or more logic blocks included in a programmable logic device (for example a field programmable gate array). The described modules may be adapted, and/or additional structures may be provided, to provide alternative or additional functionalities beyond those specifically discussed in reference to FIGS. 3 and 4. Example of such alternative or additional functionalities will be discussed in reference to the flow diagrams discussed below.

Figure 5:
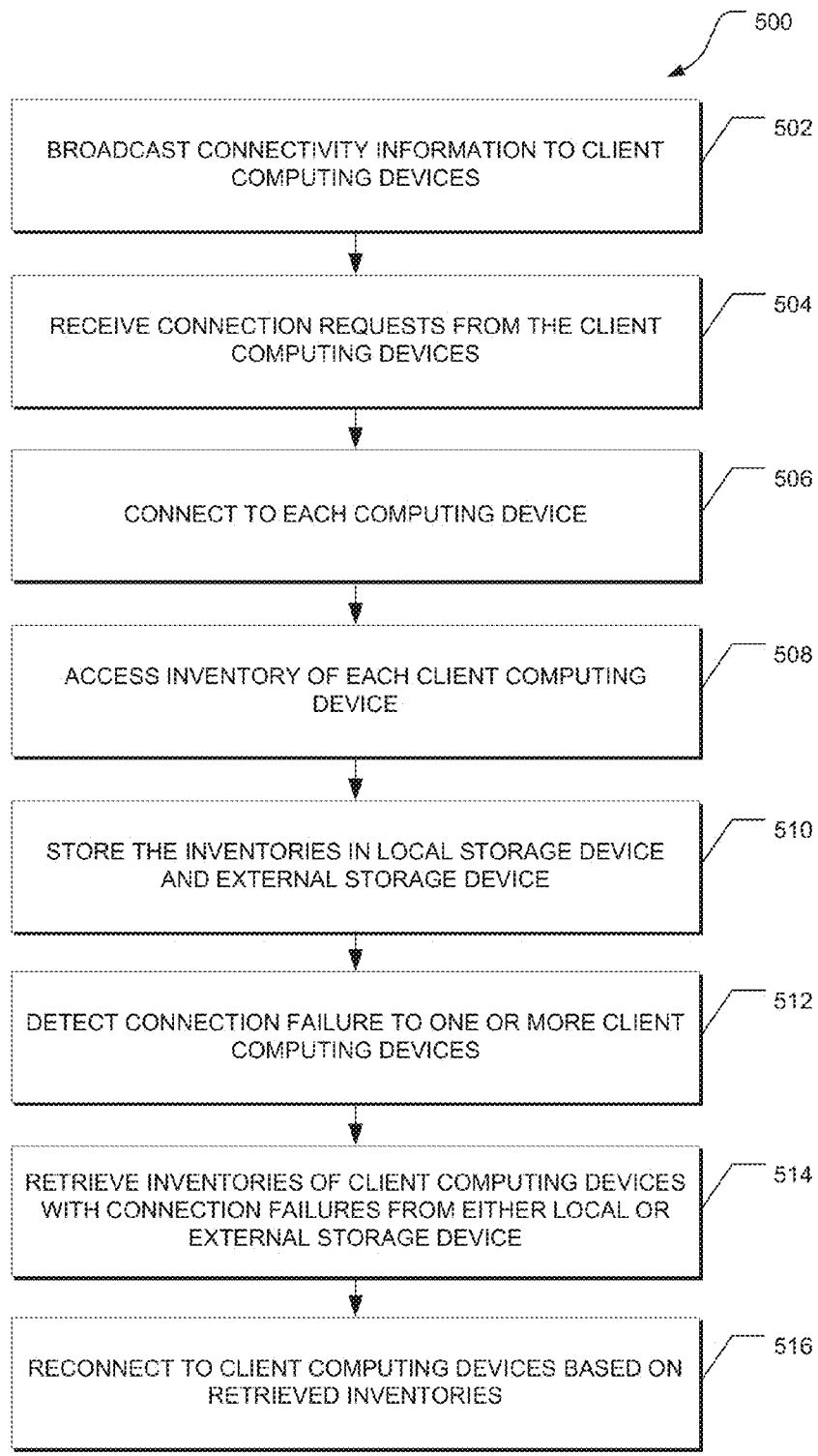
FIG. 5 depicts a flow diagram of a general overview of a method performed by a computing device, such as the computing device depicted in FIG. 3, for reconnecting to a client computing device in the event of a connection failure, in accordance with an example embodiment.

FIG. 5 depicts a flow diagram of a general overview of a method 500 performed by a computing device, such as the computing device 102 depicted in FIG. 3, for reconnecting to a client computing device in the event of a connection failure, in accordance with an example embodiment. In one example embodiment, the method 500 may be implemented by the autoconnect server module 218 depicted in FIGS. 2 and 3. In reference to FIG. 5, a broadcast module, at 502, broadcasts connectivity information to one or more client computing devices. As used herein, "connectivity information" refers to any information that can be used to connect two computing devices. Examples of connectivity information include an identifier of the computing device (e.g., UUID) and an address of the same computing device (e.g., IP address). In one example, the broadcast module can broadcast its connectivity information by way of Multicast DNS (mDNS).

In response to the broadcast, one or more of the client computing devices may transmit connection requests, and the broadcast module, at 504, receives these connection requests from the client computing devices. At 506, the broadcast module then connects to each computing device that transmitted the connection request.

With connections established to the client computing devices, a device inventory store module can access the inventory of each client computing device at 508. As an example, the device inventory store module can transmit a request to each client computing device requesting its inventory. With the retrieved inventories of the different client computing devices, the device inventory store module can store, at 510, the inventories in its local storage device, which is a storage device located within the computing device itself. Additionally, in an embodiment, the device inventory store module can also store the inventories in an external storage device, which may be located in a cloud computing environment.

Referring to 512, the broadcast module may then detect a failed connection to one or more of the client computing devices at 512. For example, each client computing device can be configured to transmit a periodic heartbeat message to the autoconnect server module. It should be appreciated that a heartbeat message is a message sent from an originator to a destination that enables the destination to identify if and when the originator fails or is no longer available. If the broadcast module detects that a heartbeat message has not been received from the client computing device for a predefined time period, the broadcast module can identify the non-receipt of the heartbeat messages as indication of a failed connection.

If a connection failure is detected, the device inventory store module can retrieve the inventory from either its local or external storage device at 514. For example, the device inventory store module can be configured to initially retrieve the inventory from its local storage device. If the inventory is not available on the local storage device, the device inventory store module can instead retrieve the inventory from the external storage device. At 516, the broadcast module can then automatically reconnect to the client computing devices based on the retrieved inventories. The reconnection can be done automatically and as a result, a user would not have to manually reconfigure each client computing device again to reconnect to a computing device. Additionally, storing the inventories on a third-party storage device (e.g., external storage device) provides a mechanism with which a computing device can retrieve inventories even in the event that the inventories stored in the local storage device have been lost, corrupted, or accidently modified.

Figure 6:
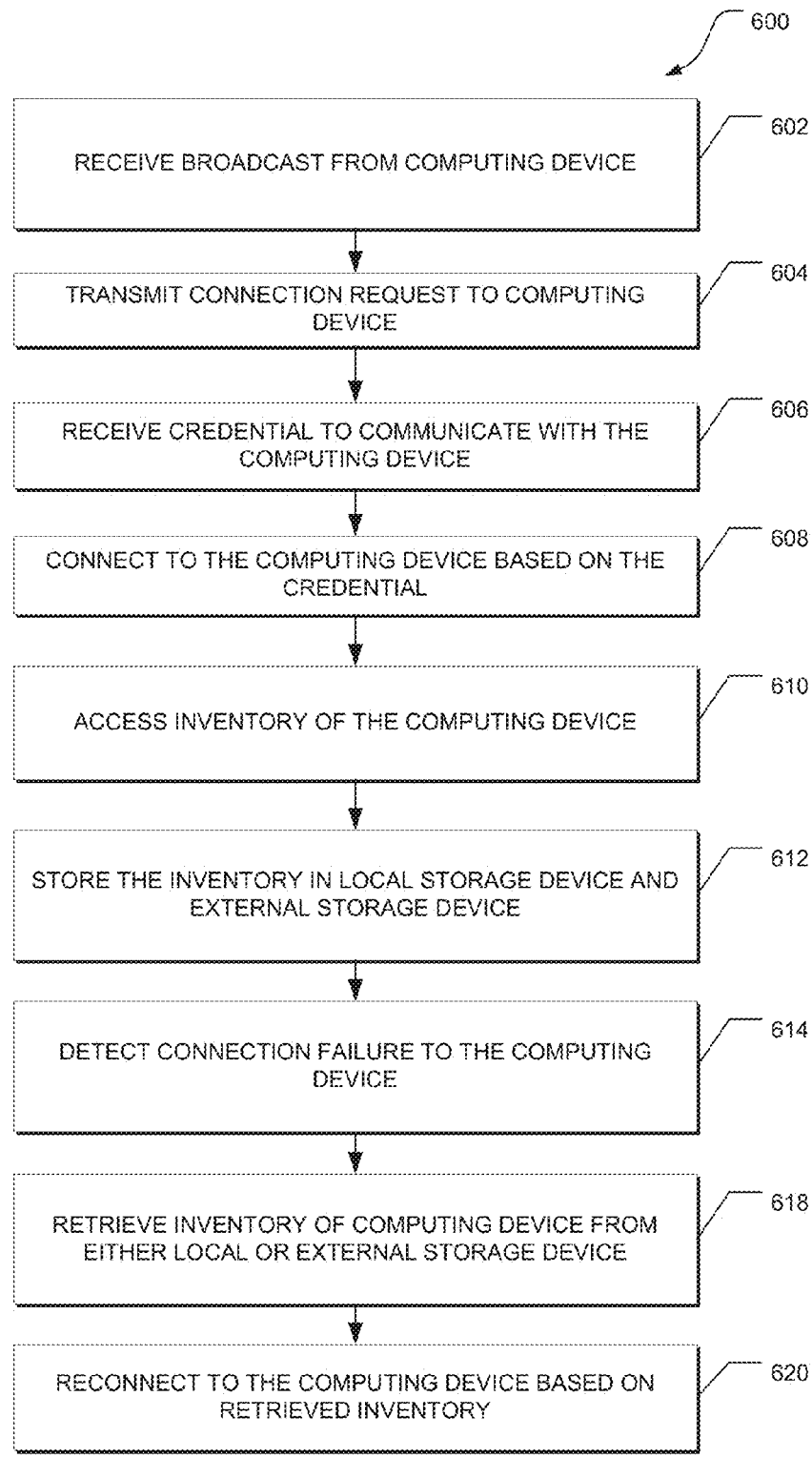
FIG. 6 depicts a flow diagram of a general overview of a method performed by a client computing device, such as the client computing device depicted in FIG. 3, for reconnecting to a computing device in the event of a connection failure, in accordance with an example embodiment.

FIG. 6 depicts a flow diagram of a general overview of a method 600 performed by a client computing device, such as the client computing device depicted in FIG. 3, for reconnecting to a computing device in the event of a connection failure, in accordance with an example embodiment. In one example embodiment, the method 600 may be implemented by the autoconnect client module 202 depicted in FIGS. 2 and 4. In reference to FIG. 6, a listener module receives, at 602, a broadcast from a computing device notifying that the computing device is available for communication. The broadcast includes connectivity information for use by the receiver to connect to the computing device that transmitted the broadcast. Upon receipt of such a broadcast, the listener module then transmits, at 604, a connection request to the computing device. Thereafter, the listener module receives a credential from the computing device to communicate with the computing device at 606. It should be appreciated that a "credential," as used herein, refers data used to establish a claimed identity or capability. Examples of credentials include user name, tokens, and certificate credentials. The listener module then uses the credentials to connect to the computing device at 608.

With communication having been established between the client computing device and the computing device, the device inventory store module may access, at 610, an inventory of the computing device that sent the broadcast. For example, the device inventory store module can request the inventory from the computing device and in turn, receives the inventory from the computing device. At 612, the device inventory store module then stores the inventory in its local storage device. Additionally, the device inventory store module can also store the inventory in an external storage device at 612.

Referring now to 614, the listener module can detect a connection failure to the computing device. In one embodiment, as discussed above, the detection can be made based on the non-receipt of heartbeat messages. If such a connection failure has been detected, the device inventory store module retrieves, at 618, the inventory of the computing device from either the local or external storage device. For example, in the event that data from the local storage device have been erased or corrupted, the device inventory store module can retrieve the inventory from the external storage device instead. At 620, the listener module then automatically reconnects to the computing device using the retrieved inventory.

Figure 7:
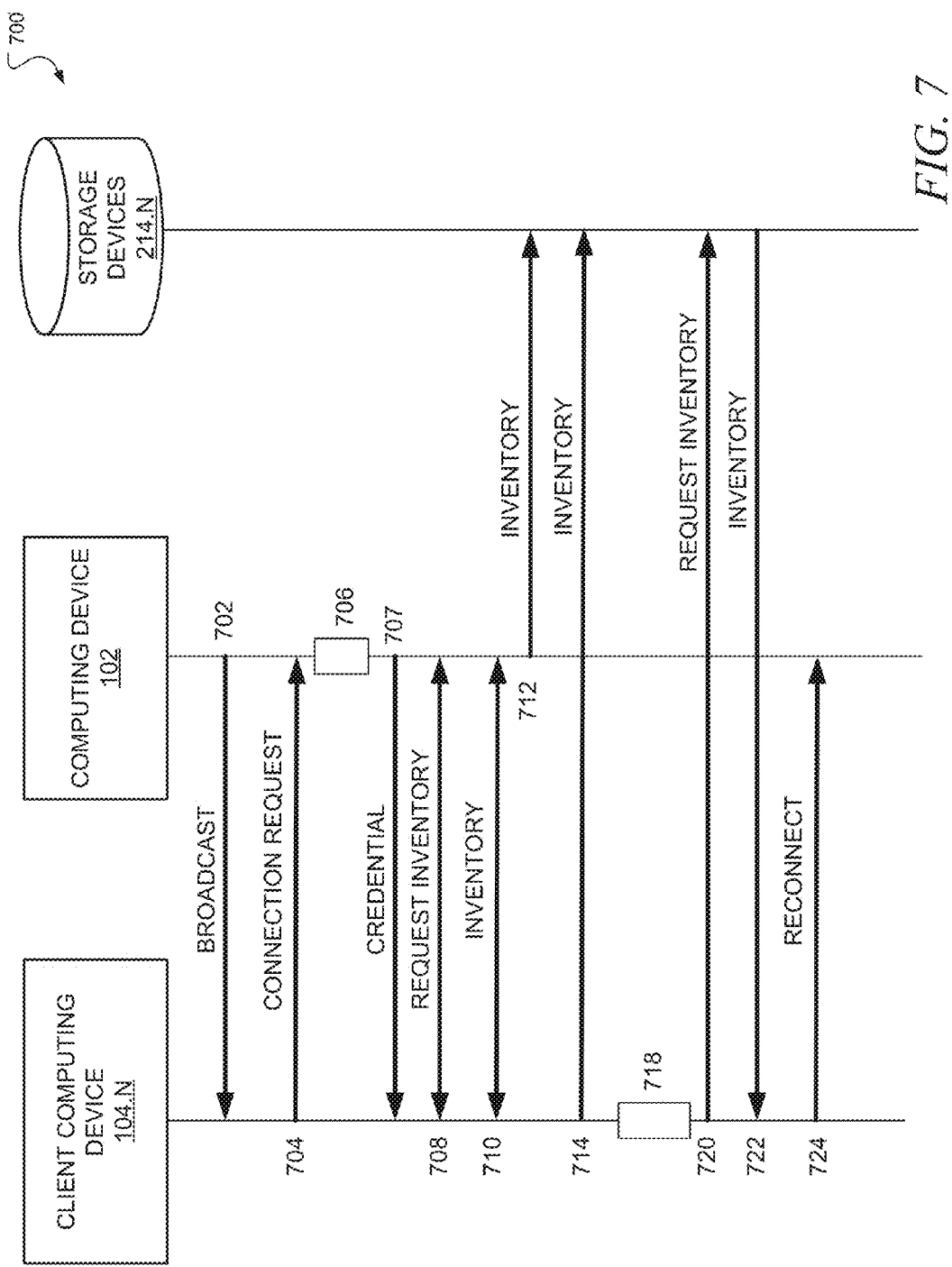
FIG. 7 is a timing diagram depicting the interactions between various components in a portion of the system depicted in FIG. 2, in accordance with an example embodiment.

FIG. 7 is a timing diagram depicting the interactions between various components in a portion of the system 100 depicted in FIGS. 1 and 2, in accordance with an example embodiment. In this embodiment, the system 700 includes a client computing device 104.N, a computing device 102, and one or more external storage devices 214.N that are accessible by the client computing device 104.N and the computing device 102. Here, the client computing device 104.N and the computing device 102 are both within the same subnet. The client computing device 104.N can discover the computing device 102, and vice versa, automatically by creating an IP network without manual operator intervention or special configuration servers. For example, as depicted in FIG. 7, the computing device 102, broadcasts, at 702, its connectivity information to the client computing device 104.N. Upon receipt of the broadcast, the client computing device 104.N then, at 704, transmits a connection request to the computing device 102.

In this embodiment, a secure, trusted connection is to be established between the client computing device 104.N and the computing device 102. In one example, the client computing device 104.N can generate an authorization code to display to a user. The generation of such an authorization code is a type of verification system to ensure that the client computing device 104.N is authorized to connect to the computing device 102. Upon seeing the authorization code generated at the client computing device 104.N, the user inputs that same authorization code at the computing device 102. At 706, the computing device 102 then verifies the authorization code. Verification can include, for example, the computing device 102 transmitting the authorization code back to the client computing device 104.N, which can confirm that the authorization code is correct. Upon verification, the computing device 102 initiates a secure network connection to the client computing device 104.N by transmitting, at 707, its credential to the client computing device 104.N such that the client computing device 104.N can establish a secure, trusted connection with the computing device 102.

However, if the client computing device 104.N and the computing device 102 did not automatically detect each other, then the user can also have a manual pairing option where the client computing devices 104.N can generate an authentication code and display its network address. A user, upon seeing this address and authorization code at the client computing device 104.N, can then manually enter this information at the computing device 102. The computing device 102 can then contact the computing device 104.N via a secure network connection and validate the authorization code, and once it has been validated, the connection would be secure and trusted.

Once a secure connection is established, both the client computing device 104.N and the computing device 102 can access each other's inventory at 708 and 710. For example, the client computing device 104.N can request, at 708, an inventory from the computing device 102 and in turn, the computing device 102 can transmit its inventory, at 710, to the client computing device 104.N, and vice versa. In this example, requested inventory can include UUIDs assigned to computing devices 102 and 104.N along with their IP addresses. At 712 and 714, the computing devices 102 and 104.N, respectively, can store the retrieved inventories on one or more external storage devices 214.N, which may be included in a cloud computing environment. If access to external storage devices 214.N is not available, the computing devices 102 and 104.N can store the inventories locally in their local storage device.

If the client computing device 104.N becomes disconnected from the computing device 102, then the client computing device 104.N can automatically reestablish the connection with the computing device 102. In one example, the client computing device 104.N, at 718, can detect that the connection has failed based on non-receipt of heartbeat messages from the computing device 102 for a predefined time period. The client computing device 104.N can retrieve a connection record of previous connections, and if the particular computing device 102 has been found in the connection record, then the client computing device 104.N can reissue a connection request to the computing device 102. To locate the computing device 102, the client computing device 104.N can iterate through its connection record attempting to locate potential computing devices. As an example, the client computing device 104.N can issue a connection request to one of the computing devices on a list in the connection record. If the connection request is refused or timed out, then the client computing device 104.N issues a connection request to a next computing device on the list from the connection record. This process is repeated for each computing device until a computing device accepts a connection request or the list is exhausted.

In addition to iterating through the connection record described above, the client computing device, at 720, can alternatively access the Internet to locate the computing device 102. In this embodiment, the client computing device 104.N can transmit a request to one or more storage devices 214.N located in a cloud computing environment. In turn, the storage devices 214.N return, at 722, an inventory of the computing device 102 back to the client computing device 104.N. At 724, the client computing device 104.N then uses this inventory to reconnect to the computing device 102. Once a connection is established, both the client computing device 104.N and the computing device 102 can update their local connection history records. These updates can also be made to inventories stored on the storage devices 214.N to facilitate future automatic reconnections.

Figure 8:
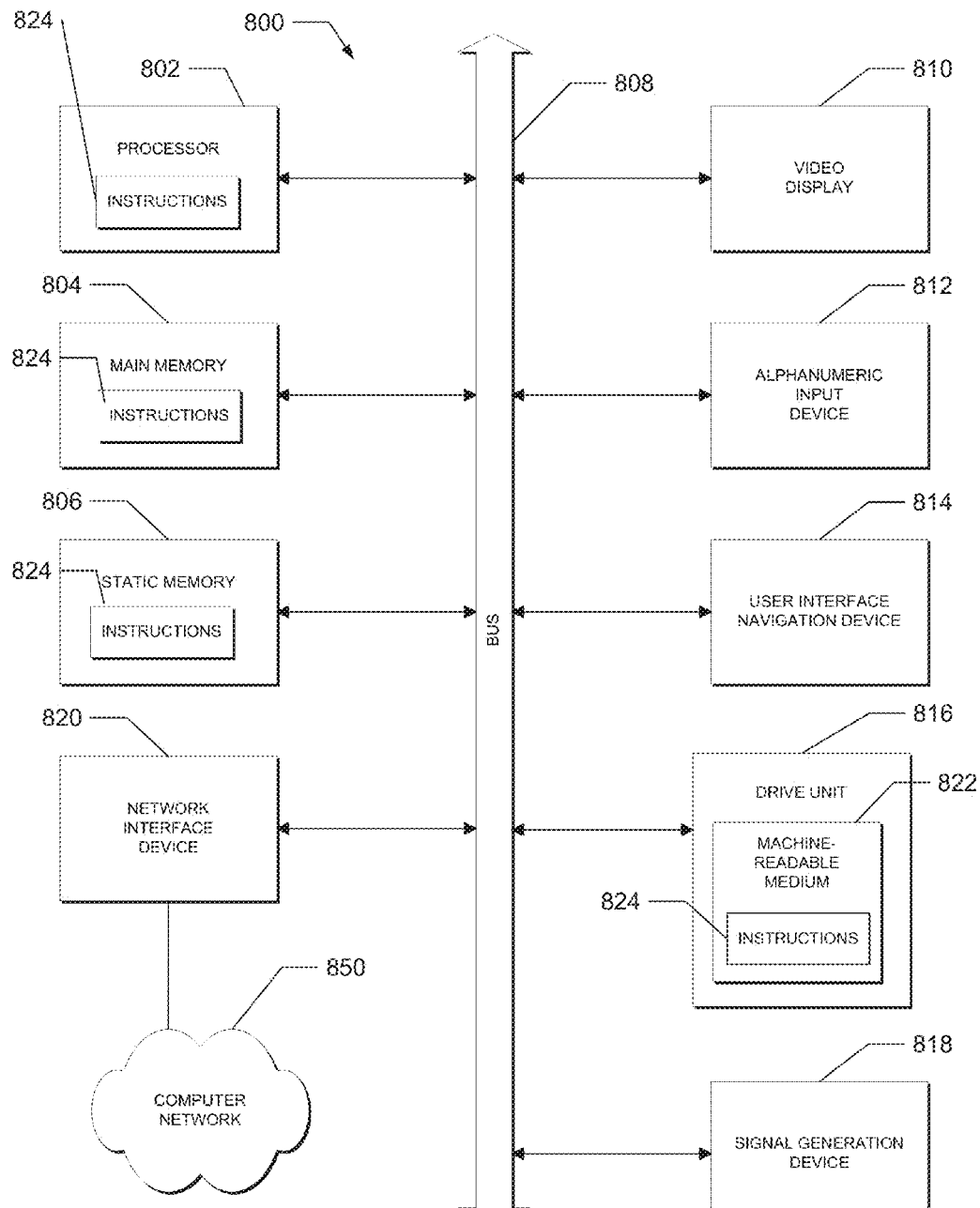
FIG. 8 depicts a block diagram of a machine in the example form of a computing device within which may be executed a set of instructions for causing the machine to perform any one or more of the methodologies discussed herein.

FIG. 8 depicts a block diagram of a machine in the example form of a computing device 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The computing device 800 may further include video display unit 810 (e.g., a plasma display, a liquid crystal display (LCD), a touch screen, or a cathode ray tube (CRT)). The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques autoconnection of computing devices may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of connecting to a client computing device, the method being performed at a computing device, the method comprising:
   connecting to the client computing device;
   accessing an inventory of the client computing device, the client computing device inventory comprising one or more attributes associated with the client computing device;
   storing the client computing device inventory in a storage device accessible by way of a computer network, the storage device being separate from the client computing device and the computing device;
   detecting, after storing the client computing device inventory, a connection failure between the computing device and the client computing device;
   retrieving, based on the detecting of the connection failure, the client computing device inventory from the storage device by way of the computer network; and
   reconnecting to the client computing device based on use of at least one attribute of the retrieved inventory.

2. The method of claim 1, wherein the connection to the client computing device comprises:
   broadcasting an identifier and an address of the computing device to the client computing device; and
   receiving a connection request from the client computing device based on the broadcast, wherein the connection is made based on receipt of the connection request.

3. The method of claim 1, wherein the storage device is located in a cloud computing environment.

4. The method of claim 1, further comprising:
   receiving an input of an authorization code; and
   verifying the authorization code,
   wherein the connection is made based on the verification of the authorization code.

5. The method of claim 1, further comprising storing the client computing device inventory in the computing device.

6. The method of claim. 1, wherein the detection of the connection failure comprises detecting non-receipt of a heartbeat message from the client computing device for a predefined time period.

7. The method of claim. 1, wherein the client computing device inventory includes an identifier of the client computing device.

8. The method of claim 1, wherein the client computing device inventory includes an address of the client computing device.

9. The method of claim 1, wherein the client computing device inventory includes security information associated with the client computing device.

10. A client computing device comprising:
    a listener module having instructions that when executed by at least one processor, cause operations to be performed, the operations comprising:
       receiving a broadcast from a computing device, the broadcast including connectivity information;
       transmitting a connection request to the computing device based on the connectivity information;
       receiving a credential from the computing device to communicate with the computing device;
       connecting to the computing device based on the credential;
       accessing an inventory of the computing device, the computing device inventory comprising one or more attributes associated with the computing device; and
       detecting a connection failure between the computing device and the client computing device; and
    an inventory store module having instructions that when executed by the at least one processor, cause operations to be performed, the operations comprising:
       storing the computing device inventory in a storage device accessible by way of a computer network, the storage device being separate from the client computing device and the computing device;
       retrieving, based on the detecting of the connection failure, the computing device inventory from the storage device by way of the computer network; and
       reconnecting to the computing device based on use of at least one attribute of the retrieved inventory.

11. The client computing device of claim 10, wherein the operation of detecting the connection failure comprises detecting non-receipt of a heartbeat message from the computing device for a predefined time period.

12. The client computing device of claim 10, wherein the storage device is located in a cloud computing environment.

13. The client computing device of claim 10, wherein the listener module having instructions that when executed by the at least one processor, cause operations to be performed, the operations comprising generating an authorization code, wherein the connection is established based on verification of the authorization code by the computing device.

14. The client computing device of claim 10, wherein the broadcast includes an identifier and an address of the computing device.

15. The client computing device of claim 10, wherein the inventory store module causes operations to be performed, the operations further comprising storing the computing device inventory in the client computing device.

16. A computing device comprising:
    a broadcaster module having instructions that when executed by at least one processor, cause operations to be performed, the operations comprising
       connecting to a client computing device;
       detecting a connection failure between the computing device and the client computing device; and
       reconnecting to the client computing device based on use of at least one attribute of a retrieved client computing device inventory; and
    an inventory store module having instructions that when executed by at least one processor, cause operations to be performed, the operations comprising:

accessing, after the connecting to a client computing device and prior to the detecting a connection failure, an inventory of the client computing device, the client computing device inventory comprising one or more attributes associated with the client computing device;

storing, prior to detecting the connection failure the client computing device inventory in a storage device accessible by way of a computer network, the storage device being separate from the client computing device and the computing device; and retrieving, based on the detecting of the connection failure, the retrieved client computing device inventory from the storage device by way of the computer network.

17. The computing device of claim 16, wherein the operation of connecting to the client computing device comprises:

broadcasting an identifier and an address of the computing device to the client computing device; and receiving a connection request from the client computing device based on the broadcast, wherein a connection is made based on receipt of the connection request.

18. The computing device of claim 16, wherein the storage device is located in a cloud computing environment.

19. A non-transitory, machine-readable medium that stores instructions, which, when performed by a machine, cause the machine to perform operations comprising: connecting to a client computing device;

accessing an inventory of the client computing device, the client computing device inventory comprising one or more attributes associated with the client computing device;

storing the client computing device inventory in a storage device accessible by way of a computer network, the storage device being separate from the client computing device and the machine;

detecting, after storing the client computing device inventory, a connection failure between the computing device and the client computing device;

retrieving, based on the detecting of the connection failure, the client computing device inventory from the storage device by way of the computer network; and reconnecting to the client computing device based on use of at least one attribute of the retrieved inventory.

* * * * *